Feb. 11, 1947. R. L. DOUGHERTY 2,415,473
SNAP ACTING THERMOSTAT
Filed May 21, 1943 2 Sheets-Sheet 1
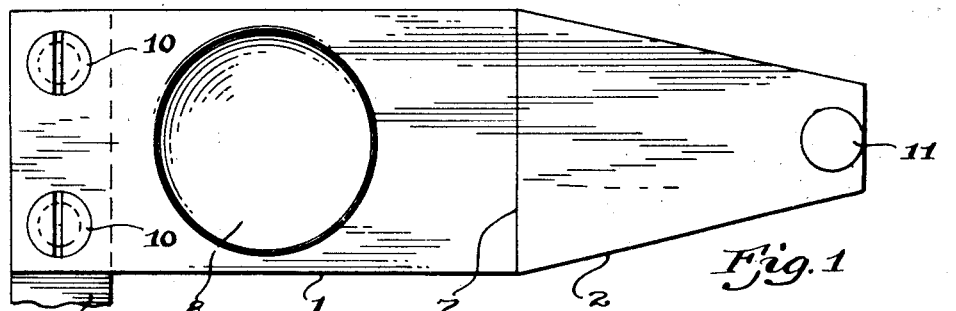
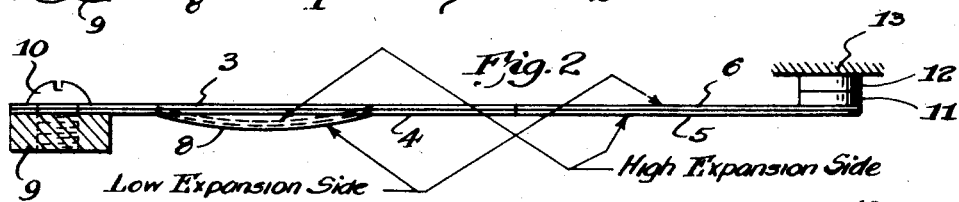
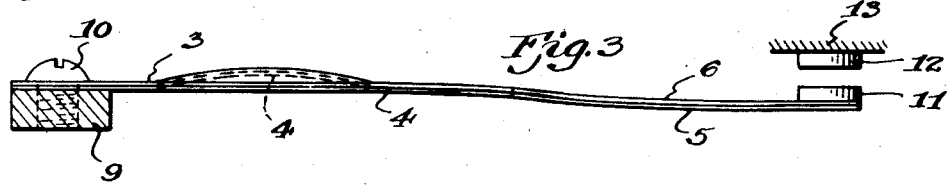
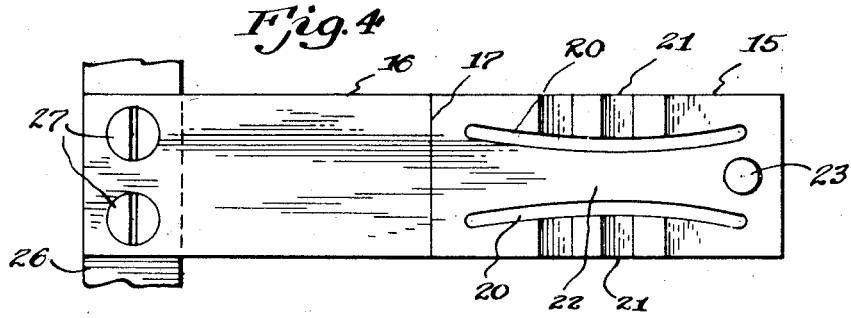
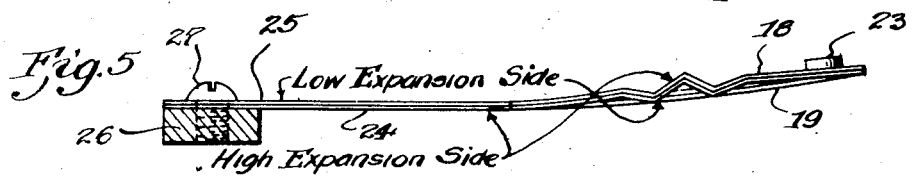
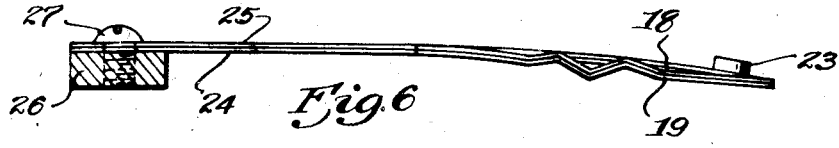
INVENTOR.
Raymond L. Dougherty
BY Barnes, Kisselle, Laughlin & Raisch
Attorneys.

Patented Feb. 11, 1947

2,415,473

UNITED STATES PATENT OFFICE 2,415,473

SNAP ACTING THERMOSTAT

Raymond L. Dougherty, Detroit, Mich., assignor to W. M. Chace Company, Detroit, Mich., a corporation of Michigan Application May 21, 1943, Serial No. 487,898

14 Claims. (Cl. 200—138)

This invention relates to a snap acting thermostat and more particularly to a snap acting thermostat which is compensated to maintain the desired contact pressure until the snap action occurs.

In a snap acting switch it is desirable to maintain the contact pressure until the instant that the snap action occurs and the contact is broken. If the contact pressure decreases before the snap action occurs, then arcing of the current between the contacts often occurs or the resistance between the contacts rises thereby causing overheating, burning and oxidation of the contact.

It is the object of this invention to produce a simple laminated thermostatic metal switch, preferably in one piece, which will maintain a predetermined contact pressure upon a change in temperature until the snap action occurs to break the circuit. This object achieved by producing a laminated thermostatic metal switch of the snap acting type and compensating the same for temperature change to maintain the desired contact pressure by means of a thermostatic laminated metal compensating element joined thereto to form a unitary or one piece compensating snap acting thermostatic element.

In the drawings:

Fig. 1 is a plan view of the thermostatic element.

Fig. 2 is a side elevation of the same with the contacts closed.

Fig. 3 is a side elevation of the same after the snap action has occurred and the contact is broken.

Fig. 4 is a plan view of a modified form of compensated thermostatic element.

Fig. 5 is a side elevation of the same at one temperature and Fig. 6 is a side elevation of the same at a higher temperature after the snap action has occurred to reverse the curvature of the thermostatic strip.

Referring more particularly to the drawings the thermostatic control comprises two strips designated 1 and 2 of laminated thermostatic metal. This laminated thermostatic metal comprises a plurality of welded or otherwise joined laminae having different coefficients of thermal expansion such as, for example, thermostatic bimetal and trimetal.

Figure 7:
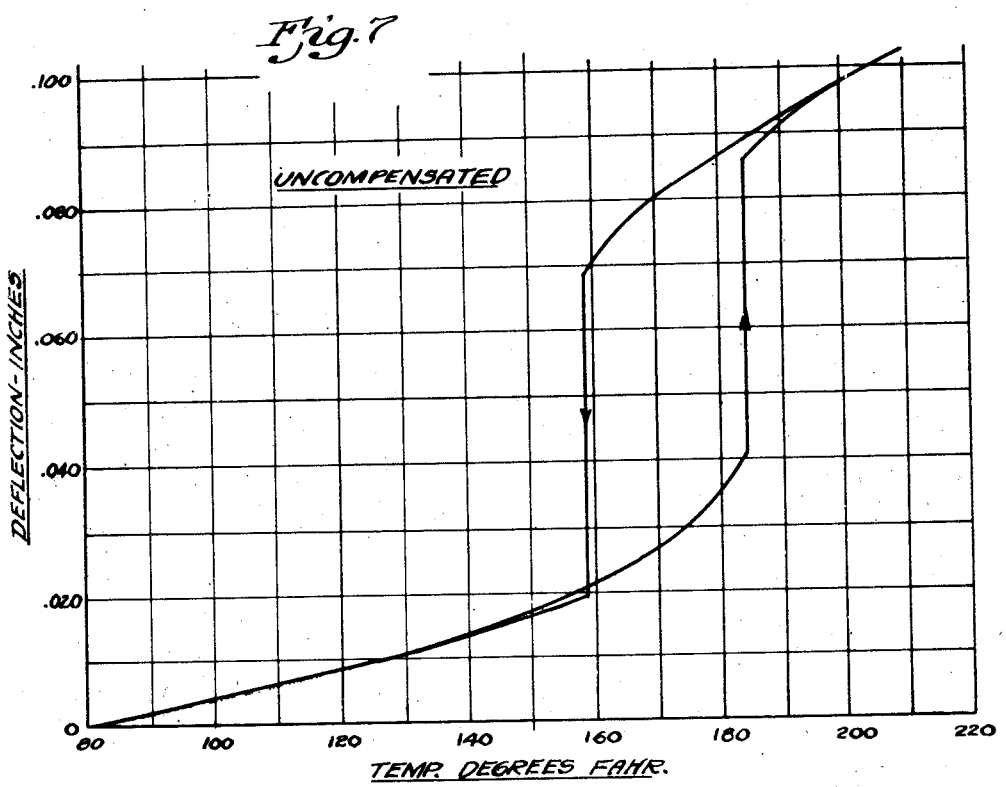
Fig. 7 is a graph showing the deflection curve of an uncompensated snap action laminated thermostatic metal element.

Strips 1 and 2, for purposes of description rather than by way of limitation, are shown as bimetal strips. Strip 1 has a high expansion lamina 3 and a low expansion lamina 4. The high and low expansion laminae comprising strip 2 are reversed in position with respect to the corresponding laminae in strip 1, that is, strip 2 has a high expanding lamina 5 on the under side of the strip and a low expanding lamina 6 on the upper side of the strip. The strips 1 and 2 are welded or otherwise joined together at their abutting edges along the line 7. Thus strip 2 in effect is a compensating extension of strip 1. Strip 1 has pressed or otherwise formed therein a dished or concavo-convex portion 8 which, during a change in temperature, upon reaching a predetermined temperature abruptly reverses its curvature. This abrupt change in curvature of the disc portion 8 gives strip 1 what is termed a "snap action." As the temperature of strip 1 including disc 8 changes and approaches said predetermined temperature, strip 1 curves or flexes due to the differential expansion of its high and low expanding laminae in a manner characteristic of bi-metal. By reference to Figs. 7 and 8 it will be seen that the predetermined temperature at which the element 1 reverses its curvature upon a rise in temperature is about 183° F. whereas upon cooling the strip reverses its curvature at a temperature of about 155° F.

The thermostat is supported at one end of strip 1 upon support 9 and is secured thereto by any suitable means such as the screws 10. Strip 2 is provided at its outer end with a contact 11 which is arranged to contact contact 12 mounted on fixed support 13. Contacts 11 and 12 when closed complete an electrical circuit so that electrical current flows through thermostat 1, 2 and contacts 11 and 12 in circuit therewith.

The thermostatic control is designed to break the circuit at any desired predetermined temperature upon a rise in temperature and to again make the circuit at a desired predetermined temperature upon a fall in temperature. As shown in Fig. 2 the circuit is closed. As the temperature of the thermostatic element 1, 2 rises, caused either by a change of the temperature of the surrounding atmosphere or caused by heat generated by a flow of electrical current therethrough, the high expanding side 3 of strip 1 expands faster than the low expanding side 4 which, in the absence of compensating element 2, would decrease the contact pressure between contacts 11 and 12. This is shown by the deflection curve in Fig. 7. However, since the compensating element 2 has its high expansion side 5 on the under side of strip 2 in reverse position to the high expanding side of strip 1, compensating element 2 tends to curve upwardly about joint 7 as a support. Owing to this upward curvature of compensating element 2, the pressure of contact 11 against contact 12 actually increases slightly, as shown by the deflection curve in Fig. 8 until a predetermined temperature is reached, such, for example, as 180°, Fig. 8, whereupon disc 8 abruptly reverses its curvature to the form shown in Fig. 3, thereby causing strip 1 to deflect or curve downwardly from its support 9 and withdraw compensating element 2 and contact 11 downwardly away from contact 12 to abruptly break the circuit.

The reverse of this operation occurs when the thermostatic control cools from the temperature which caused the thermostat to break the circuit. As the temperature falls, high expanding side 3 contracts in length relatively faster than low expanding side 4, thereby tending to move the right hand end of strip 1 upwardly, but since high expanding lamina 5 is contracting relatively faster than low expanding lamina 6 of strip 2, strip 2 tends to deflect downwardly about joint 7 and thus compensates for the opposite deflection of strip 1. However, when the temperature of the element reaches a predetermined temperature, such, for example, as 145° F., Fig. 8, disc 8 again abruptly reverses its curvature to the form shown in Fig. 2 thereby abruptly, or with a snap action, bringing contact 11 again into contact with contact 12.

Figure 8:
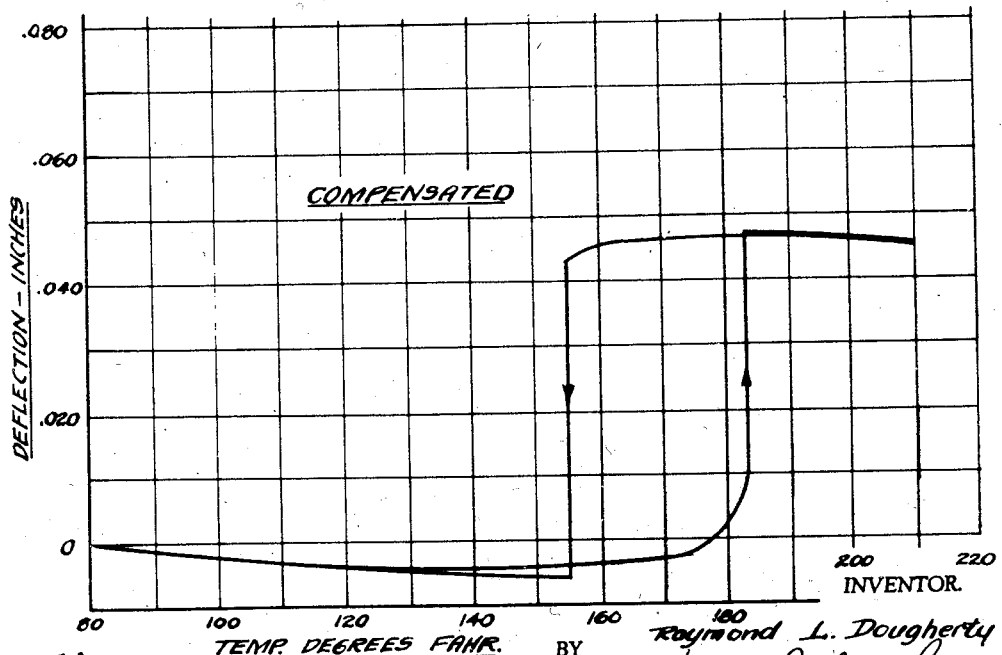
Fig. 8 is a deflection curve of the compensated snap action thermostatic element which is the subject of this application.

In Figs. 4 to 6 a modified form of snap acting thermostat is shown comprising a snap acting member 15 and a compensating member 16. Members 15 and 16 each comprise strips of laminated thermostatic metal such, for example, as bimetal or trimetal. As shown for purposes of description, members 15 and 16 each comprise a strip of thermostatic bimetal welded or otherwise joined at their abutting ends along line 17 so that strips 15 and 16 in effect become a one-piece element. Snap acting member 15 has its high expanding side 18 uppermost and its low expanding side 19 on the under side. Strip 15 is provided with arcuate slots 20. The portion of the strip between slots 20 and the side edges of the strip 15 are crinkled as at 21, thereby shortening the strip somewhat and causing a curvature in the portion 22 bounded by slots 20. Thus, curved portion 22 is restrained against elongation by the portion of strip 15 which surrounds it. Accordingly upon reaching a predetermined temperature the strip 21 will abruptly, i. e., with a snap action, change its curvature and thereby deflect the free end of strip 15 which carries contact point 23. Compensating strip 16 has a high expansion lamina 24 and a low expansion lamina 25 which are in reversed position with respect to the high and low expansion laminae of strip 15. Compensating strip 16 is secured to fixed support 26 at its outer end by any suitable means such as by screws 27. The action of this modified form of control is substantially the same as that of the principal form shown in Fig. 1. The deflection curve shown in Fig. 8 is representative of the deflection curve of both the principal and modified form of snap acting thermostat.

Upon a rise in temperature of the thermostat, as shown in Fig. 5, the high expansion side of member 15 tends to deflect the strip downwardly about joint 17 as a fulcrum, but this is compensated for by strip 16 whose differential expansion, owing to the position of the high expansion side 24 on the under side of the strip, tends to deflect strip 16 and, of course, strip 15 joined thereto, upwardly about support 26. Upon reaching a predetermined temperature such as shown in the graph, strip 15 abruptly reverses its curvature to the form shown in Fig. 6 thereby breaking the electrical circuit. Upon cooling of the thermostat from the temperature at which it broke the circuit with a snap action, a reverse of this action occurs until a predetermined temperature is reached whereupon the curvature of the strip is again abruptly reversed to that shown in Fig. 5.

I claim:

1. A thermostatic control comprising a member of thermostatic laminated metal a portion of which is confined against free change of shape thereby setting up internal stresses due to temperature change whereby said member abruptly reverses its curvature at a predetermined temperature and a second member of laminated thermostatic metal joined thereto to form an extension of said first member, said members having their high and low expansion laminae in reversed positions whereby the deflection of one of the members due to temperature change is compensated by a reverse deflection of the other member until said first member abruptly reverses its curvature, said members being constructed and arranged whereby for the same temperature change below the temperature at which the one element abruptly changes its curvature said members deflect in opposite directions in substantially equal amounts.

2. A thermostatic control comprising a member of thermostatic laminated metal a portion of which is confined against free change of shape thereby setting up internal stresses due to temperature change whereby said member abruptly reverses its curvature at a predetermined temperature, a second member of laminated thermostatic metal positioned in approximately the same plane as the first member and joined thereto, the high expanding lamina of the first member being positioned on the opposite side of the control from the high expanding lamina of the second member and the low expanding lamina of said first and second members being positioned on opposite sides of the control, said members being constructed and arranged whereby for the same temperature change below the temperature at which the one element abruptly changes its curvature said members deflect in opposite directions in substantially equal amounts.

3. The combination as claimed in claim 2 including a fixed support for one end of said control.

4. A thermostatic control comprising a strip of thermostatic laminated metal, means for confining a portion of said strip against free change of shape thereby setting up internal stresses the magnitude of which changes upon changes of temperature whereby said strip abruptly reverses its curvature upon a predetermined change in temperature, a second strip of laminated thermostatic metal joined to the first strip along one edge to form a compensating extension for the first strip, said strips having their high and low expansion laminae in reversed positions whereby deflection of the first strip is compensated or offset by deflection of the second strip upon a change in temperature until such temperature is reached whereupon the first member abruptly reverses its curvature, said strips being constructed and arranged whereby for the same temperature change below the temperature at which the one element abruptly changes its curvature said strips deflect in opposite directions in substantially equal amounts.

5. The combination as set forth in claim 4 wherein the first and second strips are welded together end to end.

6. A thermostatic control comprising a member of thermostatic laminated metal, a support for said member arranged to maintain the member arched between two spaced points and confined against free change of shape thereby setting up internal stresses the magnitude of which changes upon changes in temperature whereby the said member abruptly reverses its curvature during a change in temperature upon reaching a predetermined temperature, a second member of laminated thermostatic metal connected to the said first member having its high and low expansion laminae reversed in position with respect to the high and low expansion laminae of the said first member whereby the curvature of the second member offsets or compensates for the curvature of the first member upon a change in temperature until such temperature is reached at which the first member abruptly reverses its curvature, said members being constructed and arranged whereby for the same temperature change below the temperature at which the one element abruptly changes its curvature said members deflect in opposite directions in substantially equal amounts.

7. The combination as set forth in claim 6 wherein said second member is joined to one end of the support for said first member.

8. The combination as set forth in claim 6 wherein the support for said first member comprises a metal strip connected to the first member at spaced points.

9. The combination as set forth in claim 6 wherein the support for said first member comprises a metal strip connected to the first member at spaced points and wherein the second element is joined thereto and to said supporting strip.

10. The combination as set forth in claim 6 wherein the support for the first member is a laminated thermostatic metal strip integral with said first member.

11. A thermostatic control adapted for opening and closing an electrical circuit comprising relatively movable electrical contacts, a member of thermostatic laminated metal arranged to abruptly reverse its curvature at a predetermined temperature and a second member of laminated thermostatic metal joined thereto to form an extension of said first member, said members having their high and low expansion laminae in reversed positions, said members being constructed and arranged whereby for the same temperature change below the temperature at which the one element abruptly changes its curvature said members deflect in opposite directions in substantially equal amounts, a fixed support for one end of one of said members, and means connecting one of said contacts to the free end of the other of said members, said contacts and said members being in electrical circuit when the contacts are closed.

12. A thermostatic control adapted for opening and closing an electrical circuit with a snap action comprising relatively movable electrical contacts, a compensated thermostatic element comprising a member of thermostatic laminated metal, a support for said member arranged to maintain the member arched between spaced points and to confine said member against free change of shape thereby setting up internal stresses due to temperature change whereby said member abruptly reverses its curvature at a predetermined temperature, a compensating member of laminated thermostatic metal joined to said member and having its high and low expansion laminae reversed in respect to the position of the high and low expansion laminae of said first member, said members being constructed and arranged whereby for the same temperature change below the temperature at which the one element abruptly changes its curvature said members deflect in opposite directions in substantially equal amounts, a fixed support for one end of said element, and means for supporting one of said contacts adjacent the free end of said element, said contacts and said members being in electrical circuit when the contacts are closed.

13. The combination as set forth in claim 12 wherein the support for the first member consists of a metal strip joined along one edge to one edge of the compensating member.

14. The combination as claimed in claim 12 wherein the support for the first mentioned member consists of a strip of laminated thermostatic metal integral with the said member and wherein the compensating member is a strip of laminated thermostatic metal positioned end to end in relation to the supporting strip with the abutting ends of said supporting strip and compensating strip joined together.

RAYMOND L. DOUGHERTY.

REFERENCES CITED

The following references are of record in the file of this patent:

UNITED STATES PATENTS

| Number | Name | Date |
|---|---|---|
| 1,448,240 | Spencer | Mar. 13, 1923 |
| 2,128,869 | Winborne | Aug. 30, 1938 |
| 2,338,474 | Wilson | Jan. 4, 1944 |
| 2,336,408 | Matthews | Dec. 7, 1943 |
| 2,004,963 | Scharf | June 18, 1935 |